(12) United States Patent
Yoshihara et al.

(10) Patent No.: US 8,570,474 B2
(45) Date of Patent: Oct. 29, 2013

(54) ANTI-REFLECTION FILM

(75) Inventors: Toshiaki Yoshihara, Tokyo (JP); Eiichi Higashikawa, Tokyo (JP); Naoyuki Shibayama, Tokyo (JP)

(73) Assignee: Toppan Printing Co., Ltd. (JP)

( * ) Notice: Subject to any disclaimer, the term of this patent is extended or adjusted under 35 U.S.C. 154(b) by 116 days.

(21) Appl. No.: 13/051,772

(22) Filed: Mar. 18, 2011

(65) Prior Publication Data

US 2011/0164209 A1    Jul. 7, 2011

Related U.S. Application Data

(63) Continuation of application No. PCT/JP2009/066813, filed on Sep. 28, 2009.

(30) Foreign Application Priority Data

Sep. 30, 2008    (JP) .................................. 2008-254248

(51) Int. Cl.
*G02F 1/1335*    (2006.01)

(52) U.S. Cl.
USPC ............... 349/137; 349/96; 349/40; 349/110; 349/66; 359/601; 359/488.01; 428/447

(58) Field of Classification Search
USPC .................. 349/137, 96, 40, 110, 66
See application file for complete search history.

(56) References Cited

U.S. PATENT DOCUMENTS

| | | | |
|---|---|---|---|
| 5,875,013 A * | 2/1999 | Hiroshi | 349/110 |
| 7,149,032 B2 * | 12/2006 | Ohishi et al. | 359/586 |
| 7,633,563 B2 * | 12/2009 | Ohishi et al. | 349/8 |
| 2007/0128430 A1 * | 6/2007 | Shirai et al. | 428/323 |
| 2009/0130463 A1 * | 5/2009 | Albaugh et al. | 428/447 |

FOREIGN PATENT DOCUMENTS

| | | | |
|---|---|---|---|
| JP | 08-304606 | | 11/1996 |
| JP | 11-092750 | | 4/1999 |
| JP | 2004-004149 | | 1/2004 |
| JP | 2004-209973 | * | 7/2004 |
| JP | 2005-173216 | | 6/2005 |
| JP | 2005-181548 | * | 7/2005 |
| JP | 2005-199707 | | 7/2005 |
| JP | 2005-202389 | * | 7/2005 |
| JP | 2005-297271 | | 10/2005 |
| JP | 2006-154758 | | 6/2006 |
| JP | 2006-309163 | | 11/2006 |
| JP | 2007-094271 | | 4/2007 |
| JP | 2008-003122 | * | 1/2008 |
| WO | WO2009/081596 | | 7/2009 |
| WO | WO2009/081752 | | 7/2009 |

* cited by examiner

*Primary Examiner* — Edward Glick
*Assistant Examiner* — Sang V Nguyen
(74) *Attorney, Agent, or Firm* — Squire Sanders (US) LLP

(57) ABSTRACT

The present invention provides an anti-reflection film which provides not only sufficient anti-reflection properties and antistatic properties but also excellent contrast in a bright place and excellent contrast in a dark place especially applied on a surface of a transmissive LCD. The anti-reflection film has an antistatic hard coat layer and a low refractive index layer in order on at least one surface of a transparent substrate, average luminous reflectance in the range of 0.5-1.5% on a surface of the low refractive index layer side, haze equal to or less than 0.5%, parallel light transmittance in the range of 94.0-96.5%, and an absorption loss in average luminous transmittance in the range of 0.5-3.0%.

6 Claims, 3 Drawing Sheets

ANTI-REFLECTION FILM

This application is a continuation of International Application No. PCT/JP2009/066813, filed Sep. 30, 2008, which is incorporated herein by reference in its entirety.

BACKGROUND OF THE INVENTION

1. Field of the Invention

The present invention relates to an anti-reflection film which is used in order to prevent external light from reflecting on a surface of a window or a display etc. Specifically, the present invention relates to an anti-reflection film which is arranged on a surface of a display device such as a liquid crystal display (LCD), CRT display, organic electroluminescence display (ELD), plasma display (PDP), surface-conduction electron-emitter display (SED) and field emission display (FED) etc. In particular, the present invention relates to an anti-reflection film which is arranged on a surface of a transmissive LCD.

2. Description of the Related Art

In general, displays are used under an environment of incidence of external light. The external light incident to a display surface is regularly reflected and causes a decrease in display quality because the reflected image overlaps and disturbs the display's image. Thus, it is necessary to provide such a display surface with an anti-reflection function. Moreover, improving performance of the anti-reflection function and combining other functions with the anti-reflection function are also desired for such a display surface.

In general, an anti-reflection function is obtained by forming on a transparent substrate an anti-reflection layer which has a multilayer structure with repeating high and low refractive index layers made of transparent materials such as metal oxides etc. It is possible to form such a multilayer structured anti-reflection layer by a dry coating method such as a chemical vapor deposition (CVD) method and physical vapor deposition (PVD) method etc. Although the dry coating method as a forming method of the anti-reflection layer provides capability of precisely controlling each thickness of low refractive index layers and high refractive index layers, the dry coating method has a problem of unsuitability for mass production because of low productivity of the coating process under a vacuum condition. Accordingly, production of an anti-reflection film employing, as a forming method of the anti-reflection layer, a wet coating method in which a coating liquid is used so that a large-area-product production, continuous production and low-cost production are achieved is attracting attention.

In addition, because the anti-reflection film having such an anti-reflection layer on a transparent substrate has a relatively-soft surface, the anti-reflection layer is generally formed with a hard coat layer which is obtained by coating and curing an acrylic material so as to increase the surface hardness. This hard coat layer has a high surface hardness, transparency, lustrous properties and abrasion resistance as characteristics of an acrylic material.

However, the hard coat layer which is obtained by curing an acrylic material has a high level of insulation properties and is liable to be charged resulting in an occurrence of a problem of dirtiness due to dust attachment to a surface of the anti-reflection film in which the hard coat layer is formed. In order to solve such a problem, an anti-reflection film is required to have antistatic properties. In addition, in the case where an anti-reflection film having a hard coat layer and an anti-reflection layer is arranged on a surface of an LCD, an anti-reflection film with antistatic properties are also required to prevent charges on a surface of the LCD from adversely affecting inner operations of the LCD.

Thus, a method in which a conductive agent is added to the hard coat layer, and/or a method in which an antistatic layer is arranged between the substrate and the hard coat layer or between the hard coat layer and the anti-reflection layer are investigated.

<Patent document 1>: JP-A-2005-202389.
<Patent document 2>: JP-A-2005-199707.
<Patent document 3>: JP-A-H11-092750.
<Patent document 4>: JP-A-2004-004149.
<Patent document 5>: JP-A-2005-173216.
<Patent document 6>: JP-A-2005-297271.
<Patent document 7>: JP-A-2006-154758.

An anti-reflection film in which a conductive material is added to the hard coat layer to provide an antistatic function saves more production costs than that in which an antistatic layer is newly formed. In the case where a conductive material is added to the hard coat layer, however, optical properties of the resultant anti-reflection film varies according to the added conductive material.

In general, it is possible to reduce reflection of external light and improve contrast in a bright place by arranging an anti-reflection film having a hard coat layer and an anti-reflection layer on a surface of a display device to take advantage of its anti-reflection function. Then at the same time, it is also possible to brightly display an image because visible light transmittance is improved. In addition, an energy saving effect such as reduction of backlight power consumption can also be expected.

An anti-reflection film in which a conductive material is added to the hard coat layer, however, has a problem of insufficient contrast due to a decrease in luminance when displaying a white image (this type of luminance may be hereinafter referred to as "white luminance") because an addition of the conductive material causes low visible light transmittance of the anti-reflection film.

In addition, a transmissive LCD has a problem of low contrast in a dark place caused by an insufficiently-reduced luminance when displaying a black image ("luminance when displaying a black image" may be hereinafter referred to as "black luminance") due to a phenomenon of so-called light leakage because it is difficult to reduce orthogonal transmittance of a polarizing plate to zero. The transmissive LCD in which an anti-reflection film is arranged on the surface is provided with an anti-reflection function on the surface so that the visible light transmittance of the LCD is improved and prevention of external light reflection is achieved. The anti-reflection function and improvement of the visible light transmittance of the LCD, however, bring about an increase of light leakage when displaying a black image and particularly causes a problem of a fall in contrast in the dark place due to a high black luminance.

SUMMARY OF THE INVENTION

The present invention provides an anti-reflection film having a transparent substrate, an antistatic hard coat layer in which a conductive material is added to a hard coat layer, and a low refractive index layer in order, and further not only having a sufficient anti-reflection function and sufficient antistatic function but also capability of being arranged on a transmissive LCD surface to provide the LCD with excellent contrast in a bright place and excellent contrast in a dark place.

In order to solve the problem described above, a first aspect of the present invention is an anti-reflection film having a transparent substrate, an antistatic hard coat layer and a low refractive index layer, the antistatic hard coat layer and the low refractive index layer being formed on at least one surface of the transparent substrate, average luminous reflectance on a surface of a side on which the low refractive index layer is formed being in the range of 0.5-1.5%, haze of the anti-reflection film being 0.5% or less, parallel light transmittance of the anti-reflection film being in the range of 94.0-96.5%, and an absorption loss in average luminous transmittance of the anti-reflection film being in the range of 0.5-3.0%.

In addition, a second aspect of the present invention is the anti-reflection film according to the first aspect of the present invention, wherein a difference between the maximum and the minimum of absorption loss in light transmittance of the anti-reflection film at various wavelengths in the visible light region is 4.0% or less.

In addition, a third aspect of the present invention is the anti-reflection film according to any of the first and second aspects of the present invention, wherein a difference between the maximum and the minimum absorption loss in light transmittance of the anti-reflection film at various wavelengths in the visible light region is in the range of 0.5-4.0%, and absorption losses in light transmittance of the anti-reflection film at wavelengths of 450 nm, 550 nm and 650 nm ($Q_{450}$: absorption loss in light transmittance of the anti-reflection film at 450 nm, $Q_{550}$: absorption loss in light transmittance of the anti-reflection film at 550 nm, and $Q_{650}$: absorption loss in light transmittance of the anti-reflection film at 650 nm) satisfies a relation $Q_{450}<Q_{550}<Q_{650}$.

In addition, a fourth aspect of the present invention is the anti-reflection film according to any of the first to third aspects of the present invention, wherein the antistatic hard coat layer includes an electron-conducting polymer or an electron-conducting inorganic particle.

In addition, a fifth aspect of the present invention is the anti-reflection film according to any of the first to fourth aspects of the present invention, wherein the antistatic hard coat layer includes at least one of antimony-doped tin oxide (ATO), phosphor-doped tin oxide (PTO) and fluorine-doped tin oxide (FTO).

In addition, a sixth aspect of the present invention is the anti-reflection film according to any of the first to fifth aspects of the present invention, wherein the low refractive index layer has surface resistivity in the range of $1.0\times10^6$ to $1.0\times10^{11}\Omega/\square$.

In addition, a seventh aspect of the present invention is the anti-reflection film according to any of the first to sixth aspects of the present invention, wherein a hue of reflection on a surface of the low refractive index layer in L*a*b* color coordinate system satisfies $0.0 \leq a^* \leq 3.0$ and $-3.0 \leq b^* \leq 3.0$.

In addition, an eighth aspect of the present invention is a polarizing plate having the anti-reflection film according to any of the first to seventh aspects of the present invention, a polarizing layer and a second transparent substrate, the polarizing layer being formed on a surface of the anti-reflection film opposite from a side on which the low refractive index layer is formed, and the second transparent substrate being arranged on the polarizing layer.

In addition, a ninth aspect of the present invention is a transmissive liquid crystal display device having the polarizing plate according to the eighth aspect of the present invention, a liquid crystal cell, a second polarizing plate and a backlight unit, the polarizing plate, the liquid crystal cell, the second polarizing plate and the backlight unit being arranged in this order.

According to the present invention, it is possible to obtain an anti-reflection film which provides not only sufficient anti-reflection properties and sufficient antistatic properties but also excellent contrast in a bright place and excellent contrast in a dark place when applied on a surface of a display device, especially a transmissive LCD.

DESCRIPTION OF NUMERALS

Figure 1:
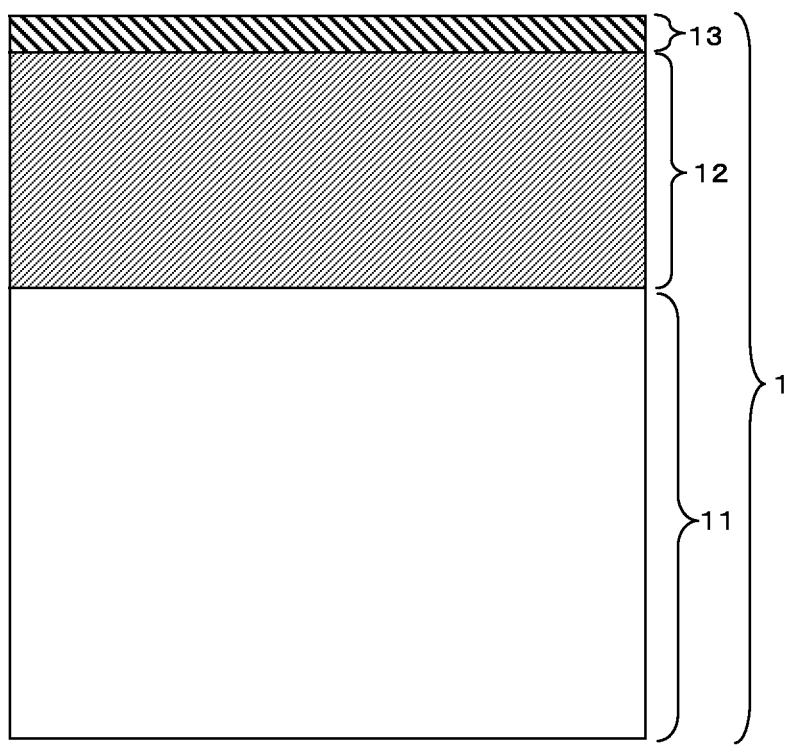
FIG. 1 is a cross sectional exemplary diagram of an anti-reflection film of the present invention.

1: Anti-reflection film
11: First transparent substrate
12: Antistatic hard coat layer
13: Low refractive index layer
2: Polarizing plate
22: Second transparent substrate
23: Polarizing layer
3: Liquid crystal cell
4: Second polarizing plate
41: Third transparent substrate
42: Fourth transparent substrate
43: Second polarizing layer
5: Backlight unit

EMBODIMENT OF THE INVENTION

An anti-reflection of the present invention is described below.

FIG. 1 illustrates an exemplary cross sectional view of an anti-reflection film of the present invention. The anti-reflection film 1 of the present invention has an antistatic hard coat layer 12 and a low refractive index layer 13 in order on at least one surface of a first transparent substrate 11. It is possible to provide a surface of the anti-reflection film with a high level of surface hardness by forming an antistatic hard coat layer 12 on the first transparent substrate 11 so that an anti-reflection film with excellent abrasion resistance is obtained. In addition, it is possible to provide the anti-reflection film with antistatic function by adding a conductive material to a hard coat layer so as to transform the hard coat layer into the antistatic hard coat layer 12. A low refractive index layer 13 is formed on the antistatic hard coat layer 12. It is possible to reduce reflection of external light incident to a surface of the anti-reflection film and improve contrast in a bright place by forming a low refractive index layer with a layer thickness corresponding to an optical thickness equal to one fourth the wavelength of the visible light region. Since visible light transmittance of the anti-reflection film is improved, white luminance and contrast of an LCD employing this anti-reflection film are improved when displaying a white image.

The anti-reflection film of the present invention has (1): average luminous reflectance in the range of 0.5-1.5% on a surface of a side on which the low refractive index layer is formed, (2): haze equal to 0.5% or lower, (3): parallel light transmittance in the range of 94.0-96.5%, and (4): 0.5-3.0% of absorption loss in average luminous transmittance. The anti-reflection film achieves sufficient anti-reflection performance and sufficient antistatic performance if all conditions (1) to (4) are satisfied. When this anti-reflection film of the present invention is arranged on a surface of a display device, especially a transmissive LCD, it is possible to provide the display device with excellent contrast in a bright place and excellent contrast in a dark place.

It is a feature of the anti-reflection film of the present invention that (1): average luminous reflectance on the surface of the side on which the low refractive index layer is formed is in the range of 0.5-1.5%. In the case where average luminous reflectance exceeds 1.5%, it is impossible to sufficiently prevent external light incident to the anti-reflection film surface from reflecting, and thus an anti-reflection film with an anti-reflection function sufficient for applying on a display device surface is not obtained. On the other hand, in the case where average luminous reflectance is less than 0.5%, it is difficult to neutralize a hue of reflection of the anti-reflection film due to a large difference between the maximum and the minimum of spectral reflectance in the visible light region (wavelength range of 400-700 nm), which leads to a problem that the anti-reflection film becomes unsuitable for applying on a display surface.

The average luminous reflectance of an anti-reflection film on the surface of the side on which the low refractive index layer is formed is obtained from a spectral reflectance curve. The spectral reflectance curve can be obtained from a measurement of spectral reflectance in a specular direction under a condition of 2 degrees of field of view using a C light source as a light source and setting both an incident angle of the light source and an output angle of a detector to angles of 5 degrees from a direction perpendicular to the anti-reflection film surface. In the measurement of spectral reflectance, the anti-reflection film is rubbed with a sandpaper etc. and coated with a black paint etc. on the opposite surface from the side on which the low refractive index layer is formed so that a reflection on the back surface (opposite surface) is eliminated, and then the measurement is performed by irradiating the low refractive index layer with a measuring light. The average luminous reflectance is a reflectance value which is obtained by correcting reflectance at various wavelengths in the visible light region with relative luminosity and averaging the resultant reflectance. At this time, photopic standard relative luminosity is used as the relative luminosity.

In addition, it is a feature of the anti-reflection film of the present invention that (2): haze is equal to 0.5% or lower. It is possible to provide the anti-reflection film with a high level of contrast in a bright place by making the haze of the anti-reflection film equal to or lower than 0.5%. In the case where the haze exceeds 0.5%, although it appears to be possible to eliminate light leakage when displaying a black image on an LCD in the dark place because of a loss in transmittance caused by scattering, contrast decreases when the black image is displayed in a bright place because the black image is blurred white due to scattering. The haze of the anti-reflection film is obtained by conforming to JIS (Japanese Industrial Standard) K 7105 (1981).

In addition, it is a feature of the anti-reflection film of the present invention that (3): parallel light transmittance is in the range of 94.0-96.5%. It is possible to provide a high level of contrast to an LCD which employs the anti-reflection film of the present invention by making the parallel light transmittance of the anti-reflection film in the range of 94.0-96.5%. In the case where the parallel light transmittance of the anti-reflection film of the present invention is less than 94.0%, white luminance of the LCD as well as contrast falls. In such a case, an improvement in parallel light transmittance which is achieved by forming a low refractive index layer in the anti-reflection film is canceled. On the other hand, it is practically difficult to manufacture an anti-reflection film having a parallel light transmittance higher than 96.5% considering the back surface reflection etc. Thus, it is a feature of an anti-reflection film of the present invention that the parallel light transmittance is 96.5% or lower. The parallel light transmittance of the anti-reflection film can be obtained conforming to JIS K 7105 (1981).

In addition, it is a feature of the anti-reflection film of the present invention that (4): absorption loss in average luminous transmittance is in the range of 0.5-3.0%.

The absorption loss in light transmittance $Q_\lambda$ is obtained by formula 1 below.

$$Q_\lambda = 100 - H - T_\lambda - R_\lambda \qquad \text{(formula 1)}$$

where $Q_\lambda$: absorption loss in light transmittance (%),
H: haze (%),
$T_\lambda$: spectral transmittance (%),
$R_\lambda$: both surface reflectance N.

Both surface reflectance $R_\lambda$ herein refers to a sum of (frontal) surface reflectance Rs and back-surface reflectance Rb. A measurement of surface reflectance Rs of the anti-reflection film is performed after the anti-reflection film is rubbed with a sand paper etc. and is coated with a black paint etc. so that the back-surface reflection is canceled At this point, it is possible to measure both surface reflectance $R_\lambda$ (=Rs+Rb) at a wavelength λ if the back-surface reflectance is not canceled (by skipping both the rubbing with a sand paper etc. and the coating with a black paint etc.). As is apparent from formula 1, the absorption loss in light transmittance in the present invention is not a loss caused by scattering but a loss caused by light absorption.

The haze of the anti-reflection film is obtained conforming to JIS K 7105 (1981). The spectral transmittance and both surface reflectance $R_\lambda$ are obtained by measuring spectral reflectance in the specular direction and in the rectilinear transmission direction under a condition of 2 degrees of field of view using the C light source as a light source and setting both an incident angle of the light source and an output angle of the detector to angles of 5 degrees from a direction perpendicular to the anti-reflection film surface. The absorption loss in average luminous transmittance Q is a value which is obtained by correcting "absorption loss in light transmittance $Q_\lambda$ at various wavelengths in the visible light region" with relative luminosity and averaging the resultant absorption loss in light transmittance. At this time, photopic standard relative luminosity is used as the relative luminosity.

According to the present invention, it is possible to obtain an anti-reflection film capable of providing a display device with excellent contrast in a bright place and excellent contrast in a dark place by making the absorption loss in average luminous transmittance in the range of 0.5-3.0%. In the case where the absorption loss in average luminous transmittance is less than 0.5%, the black luminance increases and contrast in the dark place falls because it is impossible to sufficiently prevent light leakage when displaying a black image. On the other hand, in the case where absorption loss in average luminous transmittance exceeds 3.0%, although it is possible to reduce black luminance of a display device in a dark place, white luminance is also reduced resulting in a fall in contrast.

In addition, it is preferable that a difference between the maximum and the minimum of the absorption loss in light transmittance at various wavelengths in the visible light region is 4.0% or less in the anti-reflection film of the present invention.

A curve of absorption loss in light transmittance does not have a steep peak in the visible light region and shows a moderate dependence on wavelengths when the difference between the maximum and the minimum of absorption loss in light transmittance at various wavelengths is 4.0% or less. As a result, good color reproducibility is achieved if an anti-reflection film having such a feature is applied on a surface of a display device. In the case where the difference between the maximum and the minimum of the absorption loss in light transmittance at various wavelengths in the visible light region exceeds 4.0%, a specific and strong photo-absorption appears in the visible light region, and thus a white image may be displayed somewhat colored on the display device. The visible light region for determining the maximum and the minimum absorption loss in light transmittance here is a wavelength range of 400-700 nm.

In addition, it is preferable that the difference between the maximum and the minimum absorption loss in light transmittance at various wavelengths in the visible light region is in the range of 0.5-4% and a relation $Q_{450}<Q_{550}<Q_{650}$ ($Q_{450}$: absorption loss in light transmittance at a wavelength of 450 nm, $Q_{550}$: absorption loss in light transmittance at a wavelength of 550 nm, and $Q_{650}$: absorption loss in light transmittance at a wavelength of 650 nm) is satisfied in an anti-reflection film of the present invention.

It is possible to gradually increase absorption loss in light transmittance as the wavelength becomes longer and to provide a transmissive LCD with excellent color reproducibility when the anti-reflection film is applied on the transmissive LCD if the difference between the maximum and the minimum absorption loss in light transmittance is adjusted within the range of 0.5-4.0% and satisfying the relation $Q_{450}<Q_{550}<Q_{650}$.

Spectral characteristics of light transmitted through a pair of polarizing plates in which their polarizing directions are arranged in parallel with each other and in which an iodine-added elongated polyvinyl alcohol is used as a polarizing layer show a low transmittance in the short wavelength region and a high transmittance in the long wavelength region. Accordingly, a transmissive LCD having a polarizing plate which employs an iodine-added elongated polyvinyl alcohol as a polarizing layer is sometimes colored with yellow when displaying a white image. At this point, an anti-reflection film which has absorption loss in light transmittance having a mild absorption in the long wavelength area in the visible light region by making the difference between the maximum and the minimum of absorption loss in light transmittance within the range of 0.5-4.0% and satisfying the relation $Q_{450}<Q_{550}<Q_{650}$ can compensate the yellowish color when applied on a display surface. In other words, spectral characteristics of light transmitted through both the anti-reflection layer and the polarizing plate are neutralized so that the yellowish color of the transmissive LCD when displaying a white image is canceled.

In the case where the difference between the maximum and the minimum of absorption loss in light transmittance at various wavelengths in the visible light region (wavelength in the range of 400-700 nm) exceeds 4.0%, it is inevitable that the anti-reflection film has a large photo-absorption peak and thus the film is colored. On the other hand, in the case where the difference between the maximum and the minimum absorption loss in light transmittance at various wavelengths in the visible light region is less than 0.5%, it is impossible to neutralize yellowish color which appears when displaying a white image.

In addition, it is preferable that the antistatic hard coat layer includes an electron-conducting polymer or electron-conducting inorganic particles in an anti-reflection film of the present invention. It is necessary to add a conductive material in order to provide the hard coat layer with an antistatic function and there are two types of conductive materials, that is, an electron-conducting material and an ion-conducting material. The electron-conducting material performs an antistatic function more stably than the ion-conducting material even under a low humidity condition.

In addition, it is preferable in the present invention that conductive inorganic particles of tin oxide series are used. Conductive inorganic particles of tin oxide series such as antimony doped tin oxide (ATO), phosphor doped tin oxide (PTO) and fluorine doped tin oxide (PTO) etc. show a tendency to have gradually-increasing absorption loss in light transmittance at various wavelengths in the visible light region as wavelength becomes longer. Accordingly, it is possible to gradually increase absorption loss in light transmittance of the anti-reflection film at various wavelengths in the visible light region as wavelength increases by introducing conductive inorganic particles of tin oxide series into the antistatic hard coat layer. Thus, it is easily possible to manufacture an anti-reflection film which satisfies the relation $Q_{450}<Q_{550}<Q_{650}$.

In addition, it is preferable in the present invention that surface resistivity of an anti-reflection film on a side on which the low refractive index layer is formed, namely on the low refractive index layer surface, is in the range of $1.0\times10^6\Omega/\square$ to $1.0\times10^{11}\Omega/\square$. The anti-reflection film can be provided with excellent antistatic properties by making the surface resistivity of the low refractive index layer $1.0\times10^{11}\Omega/\square$ or less.

In the case where the surface resistivity of the low refractive index layer surface exceeds $1.0\times10^{11}\Omega/\square$, the anti-reflection film lacks sufficient antistatic properties resulting in possibility of dust being attached etc. to the anti-reflection film when applied on a surface of a display device. In addition, a charge on the display surface may adversely affect inner operation of the display device. In the case where the surface resistivity of the anti-reflection film on the side on which the low refractive index layer is formed is less than $1.0\times10^6\Omega/\square$, it is necessary to add a large amount of conductive inorganic particles to a binder matrix, which is not economical. In addition, optical properties of the anti-reflection film become unsatisfactory for an application on a display device and thus the film may be useless as far as use in the present invention.

In addition, it is preferable in the anti-reflection film of the present invention that a hue of reflection on the surface on which the low refractive index layer is formed, namely on the low refractive index layer surface, satisfies $0.0 \leq a^* \leq 3.0$ and $-3.0 \leq b^* \leq 3.0$ in L*a*b* color coordinate system. It is possible to make the anti-reflection film colorless and desirable for use on a display surface by adjusting the hue of reflection of the low refractive index layer surface to this range in the L*a*b* color coordinate system.

The closer to 0 a* and b* are, the more colorless the hue of reflection becomes. However, a region of $-3.0 \leq a^* \leq 0.0$ is a region of green, in which the relative luminosity is high and an observer easily perceive a color. Accordingly, it is preferable in the anti-reflection film of the present invention that $0.0 \leq a^* \leq 3.0$ and $-3.0 \leq b^* \leq 3.0$ are satisfied.

The hue of reflection in the anti-reflection film of the present invention is measured by a spectral photometer after the transparent substrate is coated with matte-black paint on the surface of an opposite side on which the antistatic hard coat layer and the low refractive index layer are arranged. The hue of reflection is obtained by measuring spectral reflectance in the specular direction under a condition of 2 degrees of field of view using the C light source as a light source and setting both an incident angle of the light source and an output angle of the detector to angles of 5 degrees from the direction perpendicular to the anti-reflection film surface.

Figure 2:
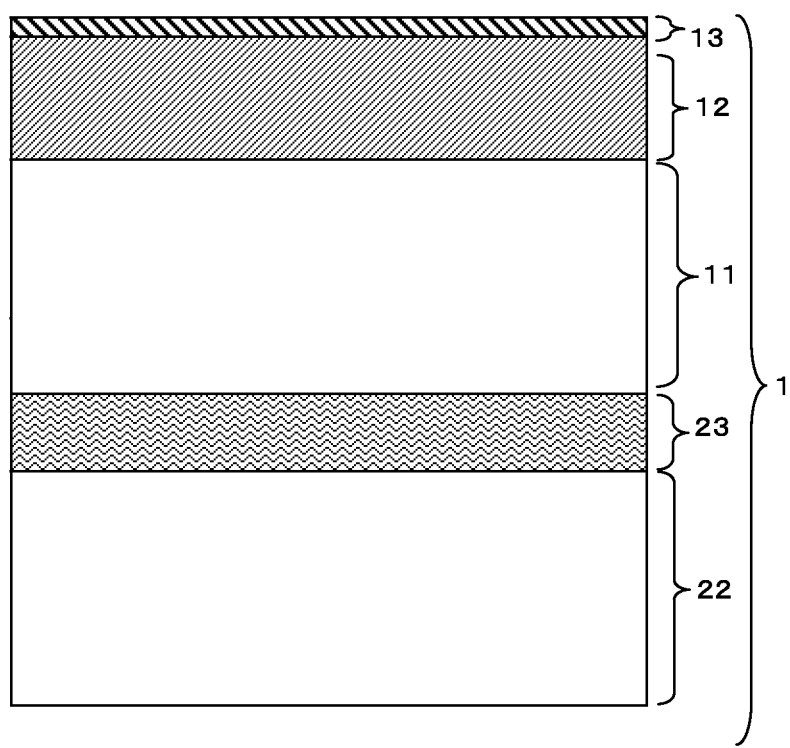
FIG. 2 is a cross sectional exemplary diagram of a polarizing plate which uses an anti-reflection film of the present invention.

Next, a polarizing plate employing an anti-reflection film of the present invention is described. FIG. 2 illustrates a cross sectional exemplary diagram of a polarizing plate employing an anti-reflection film of the present invention. The polarizing plate 2 of the present invention has a structure in which a polarizing layer is arranged between two transparent substrates. The anti-reflection film of the present invention has an antistatic hard coat layer and a low refractive index layer on one surface of the transparent substrate in this order. The polarizing plate 2 of the present invention has a polarizing layer 23 and a second transparent substrate 22 in order on an opposite surface of a first transparent substrate 11 which is a part of the anti-reflection film 1 from the side on which the anti-reflection film is formed. In other words, the first substrate 11 in the anti-reflection film 1 also plays a role of the other transparent substrate for sandwiching the polarizing layer 23.

Figure 3:
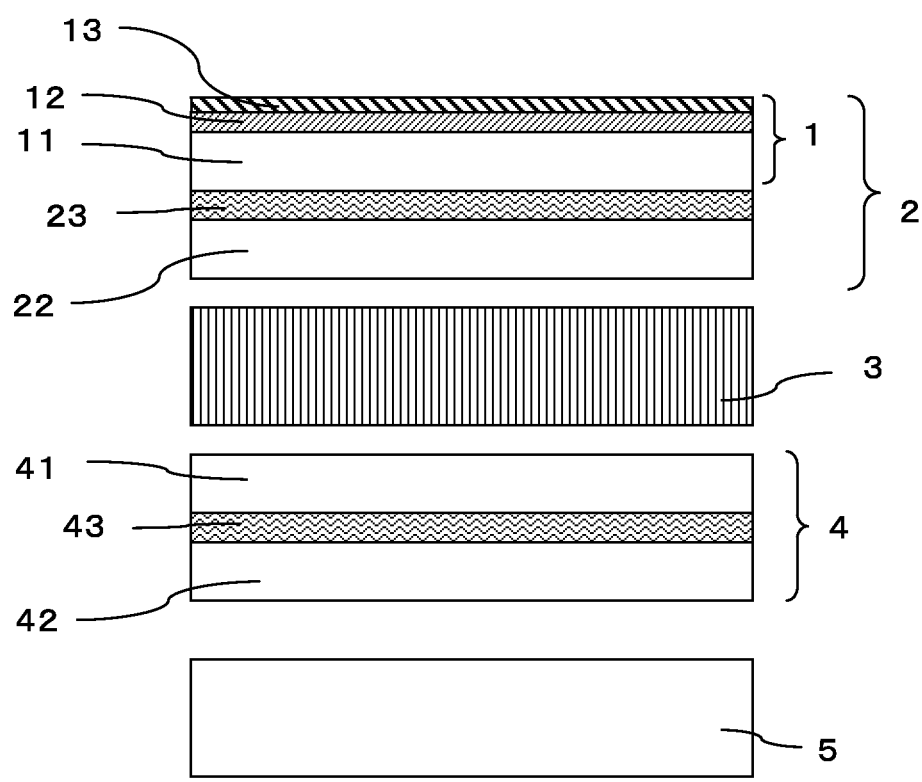
FIG. 3 is a cross sectional exemplary diagram of a transmissive LCD which has an anti-reflection film of the present invention.

Next, a cross sectional exemplary diagram of a transmissive LCD employing an anti-reflection film of the present invention is described. FIG. 3 illustrates a transmissive LCD employing an anti-reflection film of the present invention. The transmissive LCD of FIG. 3 has a backlight unit 5, a second polarizing plate 4, a liquid crystal cell 3 and a first polarizing plate 2 which includes an anti-reflection film 1 and corresponds to a polarizing plate of the present invention. At this time, the side on which the anti-reflection film is arranged is an observer's side, that is, a frontal side or a (frontal) surface of the display.

The backlight unit 5 has a light source and a light diffusion plate (not shown in the FIGs). The liquid crystal cell 3 has electrodes on one of the transparent substrate, a color filter and other electrodes on the other transparent substrate, and liquid crystal interposed between the two transparent substrates (not shown in the FIGs). The second polarizing plate 4 has a structure in which a second polarizing layer 43 is interposed between a third transparent substrate 41 and a fourth transparent substrate 42. The liquid crystal cell 3 is arranged between the first polarizing plate 2 and the second polarizing plate 4.

In addition, the transmissive LCD of the present invention may include some other functional components. A prism sheet, a luminance improver and a light diffusion film, which effectively utilize light from the backlight unit, and a retardant film, which compensates for a phase difference caused by the liquid crystal cell or by the polarizing plate, are examples of the functional component. A transmissive LCD of the present invention, however, is not limited by these examples.

Next, a method for manufacturing an anti-reflection film is described.

Films or sheets of various organic polymers can be used as transparent substrates in an anti-reflection film of the present invention. For example, substrate materials which are normally used in optical devices such as a display device etc., organic polymers including polyolefins such as polyethylene and polypropylene etc., polyesters such as polyethylene terephthalate and polyethylene naphthalate etc., celluloses such as triacetyl cellulose, diacetyl cellulose and cellophane etc., polyamides such as 6-nylon and 6,6-nylon etc., acrylates such as polymethyl methacrylate etc. polystyrene, polyvinyl chloride, polyimide, polyvinyl alcohol, polycarbonate and ethylene vinyl alcohol etc. can be used considering optical characteristics such as transparency and light refractive index etc., and other characteristics such as impact resistance, heat resistance and durability etc. Among these, polyethylene terephthalate, triacetyl cellulose, polycarbonate, and polymethyl methacrylate are preferable. In particular, triacetyl cellulose is desirably used for LCD because of low birefringence and high transparency.

It is preferable that each of the transparent substrates has a thickness in the range of 25-200 μm and more preferably in the range of 40-80 μm.

In addition, these organic polymers may be admixed with conventionally known additives, for instance, ultraviolet absorber, infrared absorber, plasticizer, lubricant, colorant, antioxidant and flame retardant etc. and functionalized. Moreover, any of the transparent substrates may be made from a copolymer and/or a polymer mixture of the above cited organic polymers as well as from a single polymer. Any of the transparent substrates may also have a multilayer structure or a plurality of sub-layers.

Next, a forming method of an antistatic hard coat layer is described. A coating liquid which contains a conductive polymer and/or an electron-conducting inorganic particles and an ionizing radiation curable material is coated on a transparent substrate to form a coated layer. After drying if necessary, the coated layer can be transformed into an antistatic hard coat layer by irradiating with ionizing radiation such as ultraviolet light and an electron beam etc. to perform a curing reaction of the ionizing radiation curable material.

Coating methods employing a roll coater, reverse roll coater, gravure coater, micro gravure coater, knife coater, bar coater, wire bar coater, die coater and dip water can be used for coating the coating liquid.

Polyacetylene, polyaniline, polythiophene, polypyrrole, poly(phenylene sulfide), poly(1,6-heptadiyne), polybiphenylene (polyparaphenylene), polyparaphenylene sulfide, polyphenyl acetylene, poly(2,5-phenylene) and derivatives of these, and in addition, polymer mixtures of any combination of these (including their derivatives) can be used as the electron-conducting polymer.

These electron-conducting polymers are preferable from the view point that electrical conductivity is provided even if relatively a small amount of these is added and that photo-absorption is observed at all wavelengths in the entire visible light region (with no specific absorption peaks). In the case where the electron-conducting polymers are used as the antistatic hard coat layer, it is possible to make the resultant anti-reflection film have an intended surface resistivity and to adjust absorption loss in average luminous transmittance within a range of 0.5-3.0% by controlling the amount of the added electron-conducting polymers.

Indium oxide, indium oxide-tin oxide (ITO), tin oxide, antimony doped tin oxide (ATO), phosphor doped tin oxide (PTO), fluorine doped tin oxide (PTO), zinc oxide, aluminum doped zinc oxide (AZO), gallium doped zinc oxide (GZO) etc. can be preferably used as the electron-conducting inorganic particles.

Among these, conductive inorganic particles of tin oxide series have a positive correlation between wavelength and light absorption, which makes it easily possible to satisfy the relation $Q_{450}<Q_{550}<Q_{650}$ with respect to absorption loss in light transmittance of the anti-reflection film. In other words, when an anti-reflection film is made into a pair of polarizing plates and the pair of polarizing plates is arranged in such a way that their polarizing layers are parallel to each other, it is possible to neutralize a hue of light transmitted through the pair of polarizing plates by adding conductive inorganic particles of tin oxide series to the antistatic hard coat layer of the anti-reflection film so that a transmissive LCD with good color reproducibility is obtained. Specifically, antimony doped tin oxide (ATO), phosphor doped tin oxide (PTO) and fluorine doped tin oxide (FTO) etc. can be used as the conductive inorganic particles of tin oxide series.

Although it is possible to suitably select the thickness of the antistatic hard coat layer and a content of conductive inorganic particles in the antistatic hard coat layer in accordance with desirable conductivity and refractive index, it is preferable that a content ratio and content per unit area of the conductive inorganic particles are less than 5 wt % and in the range of 0.1-0.8 g/m$^2$ in order to make the absorption loss in average luminous transmittance with the range of 0.5-3.0%. If the content of the conductive inorganic particles per unit area is less than 0.1 g/m$^2$, sufficient light absorption effect and conductivity cannot be expected. On the other hand, if the content of the conductive inorganic particles per unit area exceeds 0.8 g/m$^2$, transmittance excessively drops due to light absorption by the conductive inorganic particles and thus a display on which the anti-reflection film is applied will have only insufficient contrast and poor color reproducibility. It is difficult to retain all of light absorption properties, antistatic properties and hard coat properties unless the content of the conductive inorganic particles is 5 wt % or less. If only 5 wt % or less of conductive inorganic particles are added, conductivity of the antistatic hard coat layer is liable to be insufficient. Sufficient conductivity, however, can be achieved by using the conductive inorganic particles together with a conductive polymer (hybridization) or localizing or agglutinating the conductive inorganic particles by means of various characteristics (specific gravity, surface tension, compatibility and ionicity etc.).

It is preferable that the conductive inorganic particles used in the antistatic hard coat layer of the present invention have a particle diameter in the range of 1-100 nm. In the case where the particle diameter exceeds 100 nm, visible light transmittance of the anti-reflection film tends to decrease because the antistatic hard coat layer becomes white due to a strong light reflection caused by Rayleigh scattering. In addition, in the case where the particle diameter exceeds 100 nm, a haze of the anti-reflection film increases and it becomes difficult to reduce the haze to 0.5% or less. On the other hand, in the case where the particle diameter is less than 1 nm, problems such as large surface resistivity of the anti-reflection film due to a decrease in conductivity of the antistatic hard coat layer, and uneven dispersion caused by an agglutination of the conductive inorganic particles in the antistatic hard coat layer etc. may occur. Although it is possible to use solely one type of conductive inorganic particles, a plurality of types having a difference(s) in size and/or material etc. of conductive inorganic particles together may also be used.

It is possible to use acrylic materials as the ionizing radiation curable material for forming the antistatic hard coat layer. Mono-functional and/or poly-functional (meth)acrylate compounds such as acrylic or methacrylic esters of polyols or poly-functional urethane (meth)acrylate compounds which are synthesized from diisocyanates and hydroxyl esters of polyols and acrylic or methacrylic acids can be used as the acrylic materials. Besides these, polyether resins, polyester resins alkyd resins, spiroacetal resins, polybutadiene resins and polythiol-polyen resins can be used as the ionizing radiation curable material.

In this specification, (meth)acrylate refers to both acrylate and methacrylate. For example, urethane (meth)acrylate refers to urethane acrylate and urethane methacrylate.

The following materials are examples of monofunctional (meth)acrylate: 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethyl carbitol (meth)acrylate, phosphoric (meth)acrylate, (ethylene oxide)-modified phosphoric (meth)acrylate, phenoxy (meth)acrylate, (ethylene oxide)-modified phenoxy (meth)acrylate, (propylene oxide)-modified phenoxy (meth)acrylate, nonylphenol (meth)acrylate, (ethylene oxide)-modified nonylphenol (meth)acrylate, (propylene oxide)-modified nonylphenol (meth)acrylate, methoxydiethylene glycol (meth)acrylate, methoxypolyethylene glycol (meth)acrylate, methoxypropylene glycol (meth)acrylate, 2-acryloyl (or methacryloyl) oxyethyl-2-hydroxypropyl phthalate, 2-hydroxyl-3-phenoxy propyl (meth)acrylate, 2-acryloyl (or methacryloyl) oxyethyl hydrogen phthalate, 2-acryloyl (or methacryloyl) oxypropyl hydrogen phthalate, 2-acryloyl (or methacryloyl) oxypropyl hexahydrohydrogen phthalate, 2-acryloyl (or methacryloyl) oxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, 2-adamantane, and an adamantane derivative mono(meth)acrylate such as adamantyl (meth)acrylate having monovalent mono(meth)acrylate which is derived from adamantane diol etc.

The following materials are examples of difunctional (meth)acrylate: ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, and hydroxypivalic neopentyl glycol di(meth)acrylate etc.

The following materials are examples of (meth)acrylate having three or more acrylic functional groups: trifunctional (meth)acrylates such as trimethylolpropane tri(meth)acrylate, ethoxylated trimethylolpropane tri(meth)acrylate, propoxylated trimethylolpropane tri(meth)acrylate, tris(2-hydroxyethyl)isocyanate tri(meth)acrylate and glycerin tri (meth)acrylate etc., (meth)acrylates with three acrylic groups such as pentaerythritol tri(meth)acrylate, dipentaerythritol tri (meth)acrylate and ditrimethylolpropane tri(meth)acrylate etc., polyfunctional (meth)acrylates with more than three acrylic groups such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate and ditrimethylolpropane hexa(meth)acrylate etc., and polyfunctional (meth)acrylates which is obtained from these (meth)acrylate by substituting any part of these with an alkyl group or ε-caprolactone etc.

Among various acrylic materials, poly-functional urethane acrylates are preferably used because it is possible to easily control properties of the antistatic hard coat layer by designing a molecular structure and adjusting the molecular weight to a desired scale. The urethane acrylates can be obtained by a reaction of polyol, polyvalent isocyanate and acrylate having a hydroxyl group. Although UA-306H, UA-306T and UA-306I etc. (made by Kyoeisha Chemical Co., Ltd.), UV-1700B, UV-6300B, UV-7600B, UV-7605B, UV-7640B and UV-7650B etc. (made by Nippon Synthetic Chemical Industry Co., Ltd.), U-4HA, U-4HA, U-6HA, UA-100H, U-6LPA, U-15HA, UA-32P and U-324A etc. (made by Shin-Nakamura Chemical Co., Ltd.), Ebecryl-1290, Ebecryl-1290K and Ebecryl-5129 etc. (made by Daicel-UCB Co., Ltd.), UN-3220HA, UN-3220HB, UN-3220HC and UN-3220HS etc. (made by Negami Chemical industrial Co., Ltd.) are specific examples, the present invention is not limited to these.

Besides these, polyether resin, polyester resin, epoxy resin, alkyd resin, spiroacetal resin, polybutadiene resin and polythiol-polyene resin etc. which have an acrylic functional group can also be used as the ionizing radiation curable material.

In addition, in the case where the coating liquid for forming the antistatic hard coat layer is cured by ultraviolet light, a photopolymerization initiator is added to the coating liquid for forming the antistatic hard coat layer. The photopolymerization initiator is an additive which generates radicals as ultraviolet light is irradiated. For example, acetophenone, benzoin, benzophenone, phosphine oxide, ketals, anthraquinone and thioxanthone can be used as the photopolymerization initiator. In addition, an amount of photopolymerization initiator added to the coating liquid is preferably in the range of 0.1-10 parts by weight, and is more preferably 1-7 parts by weight relative to 100 parts by weight of ionizing radiation curable material.

Moreover, it is possible to add a solvent and/or various additives to the coating liquid for forming the antistatic hard coat layer if necessary. Considering coating suitability etc. the solvent can be properly selected from aromatic hydrocarbons such as toluene, xylene and cyclohexylbenzene, etc., hydrocarbons such as n-hexane and cyclohexane etc., ethers such as dibutyl ether, dimethoxymethane, dimethoxyethane, dimethoxyethane, propylene oxide, dioxane, dioxolane, trioxane, tetrahydrofuran, anisole, phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., and cellosolves such as methyl cellosolve, cellosolve, butyl cellosolve and cellosolve acetate etc. In addition, a surface conditioner, a refractive index adjuster, an adhesiveness improver and/or a curing agent may be added as an additive to the coating liquid.

It is preferable in particular that the coating liquid for forming the antistatic hard coat layer includes a solvent which dissolves the transparent substrate or causes the transparent substrate to swell. It is possible to improve adhesiveness between the antistatic hard coat layer and the transparent substrate by making the coating liquid admixed with the solvent which dissolves the transparent substrate or causes the transparent substrate to swell.

In addition, it is also possible to add particles having 100 nm or less of average diameter to the coating liquid for forming the antistatic hard coat layer besides the conductive inorganic particles in order to improve surface hardness of the antistatic hard coat layer. In the case where particles having an average diameter more than 100 nm are added to the coating liquid, the resultant antistatic hard coat layer is liable to appear white by strong reflection due to Rayleigh scattering and have low transparency. Moreover, haze of the antistatic hard coat layer is liable to increase.

It is preferable that the antistatic hard coat layer of the present invention does not include particles having an average particle diameter more than 100 nm so as to obtain a haze of 0.5% or less and a display image having a high level of contrast. It is possible to add particles of alumina ($Al_2O_3$) or nano-particles of silica ($SiO_2$) having an average diameter 30 nm by a ratio of about 20-30 wt % as the "particles having 100 nm or less of average diameter" mentioned previously.

In addition, other additives may be added to the coating liquid for forming the antistatic hard coat layer. Antifoam, a leveling agent, an antioxidant, an ultraviolet absorber, a light stabilizer and a polymerization inhibitor etc. are examples of the additives although the present invention is not limited to these.

In addition, in order to prevent the resultant anti-reflection film from curling, a heat plastic resin may be added to the coating liquid for forming the antistatic hard coat layer after the antistatic hard coat layer is formed. The antistatic hard coat layer is formed as described above.

It is preferable that the antistatic hard coat layer has a thickness in the range of 3-15 μm. In the case where the antistatic hard coat layer has a thickness less than 3 μm, a surface hardness of the anti-reflection film becomes insufficient and abrasion resistance decreases. On the other hand, in the case where the antistatic hard coat layer has a thickness more than 15 μm, the antistatic hard coat layer excessively curls due to curing shrinkage resulting in problems such as inconvenience in manufacturing a polarizing plate from the anti-reflection film and/or cracks on the antistatic hard coated layer.

Before the low refractive index layer is formed on the antistatic hard coat layer, a surface treatment such as acid treatment, alkaline treatment, corona treatment and atmospheric pressure glow discharge plasma treatment etc. may be performed. Such surface treatments improve adhesiveness between the antistatic hard coat layer and the low refractive index layer.

In the case where a metal alkoxide or silicon alkoxide is used as a binder matrix forming material in forming the low refractive index layer, it is preferable that the antistatic hard coat layer receives an alkaline treatment before forming the low refractive index layer. It is possible to improve adhesiveness between the antistatic hard coat layer and the low refractive index layer by the alkaline treatment so that abrasion resistance of the anti-reflection film is still further improved.

A forming method of the low refractive index layer in the anti-reflection film of the present invention is described below. The low refractive index layer of the present invention can be formed by a wet coating method in which a coating liquid containing low refractive index particles and a binder matrix forming material is coated on the antistatic hard coat layer to form a coated layer and then the coated layer is cured. At this time, a coating method which employs a roll coater, a reverse roll coater, a gravure coater, a micro gravure coater, a knife coater, a bar coater, a wire bar coater, a die coater or a dip coater can be used.

Particles made of a low refractive index material such as LiF, MgF, 3NaF—AlF and AlF (refractive index: 1.4 respectively) and $Na_3AlF_6$ (cryolite, refractive index: 1.33) etc. can be used as the low refractive index particles. In addition, particles having a pore(s) inside can be also preferably used. Particles having a pore(s) inside can have a significantly low refractive index because the refractive index of pore should be equal to a refractive index of air ($\approx 1$). Specifically, low refractive index silica particles having a pore(s) inside can be used.

It is preferable that the low refractive index particles used in the low refractive index layer of the present invention have a particle diameter in the range of 1-100 nm. In the case where the particle diameter exceeds 100 nm, the low refractive index layer appears white since light is strongly reflected due to Rayleigh scattering, and thus transparency of the anti-reflection film is liable to decrease. On the other hand, in the case where the particle diameter is less than 1 nm, problems such as uneven dispersion of particles in the low refractive index layer caused by agglutination may occur.

It is possible to use silicon alkoxide hydrolysate as the binder matrix forming material. It is preferable that the silicon alkoxide hydrolysate is a hydrolysate of a silicon alkoxide which is expressed by chemical formula (1): $R_xSi(OR)_{4-x}$, where R is an alkyl group and x is an integer satisfying $0 \leq x \leq 3$.

For example, tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane and hexyltrimethoxysilane etc. can be used as the silicon alkoxide which is expressed by the chemical formula (1). The silicon alkoxide hydrolysate is obtained from the silicon alkoxide of the chemical formula (1) by, for example, a hydrolysis with hydrochloric acid.

Moreover, it is possible to add a silicon alkoxide hydrolysate of the chemical formula (2): $R'_zSi(OR)_{4-z}$, where R' is an inactive functional group having an alkyl group, a fluoroalkyl group or a fluoroalkylene oxide group and z is an integer satisfying $1 \leq z \leq 3$ to the silicon alkoxide hydrolysate of the chemical formula (1) as the binder matrix forming material for the coating liquid for forming a low refractive index layer. This addition of a silicon alkoxide hydrolysate of the chemical formula (2) provides antifouling properties to the low refractive index layer surface of the anti-reflection film and decreases the refractive index of the low refractive index layer further.

Examples of the silicon alkoxide of the chemical formula (2) are octadecyltrimethoxysilane and 1H,1H,2H,2H-perfluorooctyltrimethoxysilane etc.

In addition, it is also possible to use an ionizing radiation curable material as the binder matrix forming material. An ionizing radiation curable material similar to the case of the coating liquid for forming the antistatic hard coat layer mentioned previously can be used as the ionizing radiation curable material herein. In addition, in the case where the low refractive index layer is formed using an ionizing radiation curable fluoro-compound, it may be unnecessary to add low refractive index particles. In addition, even in the case of using an ionizing radiation curable material as the binder matrix forming material, it is preferable that a fluoro-material or a silicone material, which provides antifouling properties to the low refractive index layer surface, is added.

In the case where a silicon alkoxide hydrolysate is used as the binder matrix forming material, it is possible to form the low refractive index layer by coating a coating liquid which contains the silicon alkoxide hydrolysate and low refractive index particles onto the antistatic hard coat layer formed on the transparent substrate to form a coated layer followed by drying and heating the coated layer to perform a dehydrating condensation to produce the silicon alkoxide. In addition, in the case where an ionizing radiation curable material is used as the binder matrix forming material, it is possible to form the low refractive index layer by coating a coating liquid which contains the ionizing radiation curable material and low refractive index particles onto the antistatic hard coat layer formed on the transparent substrate to form a coated layer followed by drying if necessary and then irradiating the coated layer with ionizing radiation such as UV or EB to cure the ionizing radiation curable material.

If necessary, solvents and/or additives can be added to the coating liquid for forming the low refractive index layer. Aromatic hydrocarbons such as toluene, xylene and cyclohexylbenzene etc., hydrocarbons such as cyclohexane and n-hexane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., alcohols such as methanol, ethanol and isopropyl alcohol etc., and water can be used as the solvent considering coating suitability etc. In addition, antifoulant, surface conditioner, leveling agent, refractive index conditioner, adhesiveness improver and photosensitizer etc. can be added as the additives to the coating liquid.

In the case where an ionizing radiation curable material is used as the binder matrix forming material and irradiated with UV to form the low refractive index layer, a photopolymerization initiator is added to the coating liquid for forming the low refractive index layer. Examples of the photopolymerization initiator are acetophenone, benzoin, benzophenone, phosphine oxide, ketals, anthraquinone, thioxanthone. The low refractive index layer is formed as described above.

It is also possible to form the low refractive index layer of the anti-reflection film of the present invention by means of a vacuum process such as vacuum deposition method or sputtering method using a low refractive index material such as silicon oxide etc. Moreover, it is also possible to improve anti-reflection performance of the anti-reflection film of the present invention by arranging a high refractive index layer(s) other than the low refractive index layer(s). However, it should be noted that these optional methods have high costs given the present level of technology.

In the case where no high refractive index layer is arranged in the anti-reflection film of the present invention, the low refractive index layer is formed in such a way that optical thickness (nd) of the low refractive index layer, which is obtained by multiplying thickness (d) by refractive index (n) of the low refractive index layer, becomes one fourth the wavelength of the visible light. At this time, it is preferable that optical thickness of the low refractive index layer is in the range of 115-135 nm. It is possible to reduce a hue of reflection by making the optical thickness of the low refractive index layer in the range of 115-135 nm and approximately λ/4 (where λ=500 nm). In addition, while the low refractive index layer may have some variation in thickness since the low refractive index layer is formed by a wet coating method, it is possible to reduce color unevenness of the anti-reflection film which is caused by a thickness variation of the low refractive index layer by adjusting the optical thickness thereof within the range of 115-135 nm.

The anti-reflection film of the present invention is formed as described above. If necessary, function layers which provide antifouling properties, electromagnetic shielding properties, infrared absorption properties, ultraviolet absorption properties and color compensation properties etc. are arranged other than the antistatic hard coat layer and the low refractive index layer in the anti-reflection film of the present invention. Specifically, an antifouling layer, an electromagnetic shielding layer, an infrared absorption layer, an ultraviolet absorption layer and a color compensation layer are examples. Each of these function layers may either consist of a single layer or a plurality of layers. A plurality of function may be included in a single function layer. In addition, these function layer may be arranged either on the surface of the anti-reflection film or between other layers. Moreover in the present invention, a primer layer and/or an adhesion layer etc. may be arranged between layers for the purpose of improving adhesiveness between the layers.

An anti-reflection film of the present invention can be transformed into a polarizing plate by arranging a polarizing layer and a second transparent substrate on a surface opposite from the side on which the low refractive index layer is formed. An iodine-added elongated polyvinyl alcohol (PVA), for example, can be used as the polarizing layer. In addition, the transparent substrate material of the anti-reflection film of the present invention can be used as the second transparent substrate, and a triacetyl cellulose film can be preferably used.

In addition, a polarizing plate which employs an anti-reflection film of the present invention as one of components thereof provides a transmissive LCD with an excellent antistatic function, anti-reflection function, and good contrast in a bright place and in a dark place if applied to the transmissive LCD. At this time, the polarizing plate is arranged in such an order that the polarizing plate is arranged nearest to an observer followed by a liquid crystal cell, a second polarizing plate and a backlight unit, which is the farthest away. In other words, the low refractive index layer is arranged nearest surface to the observer.

EXAMPLE

Example 1

<Transparent Substrate>
An 80 μm-thick triacetyl cellulose film was used as the transparent substrate.
<Polarizing Plate>
A polarizing plate in which an iodine-added elongated polyvinyl alcohol as the polarizing layer was interposed between two 80 μm-thick triacetyl cellulose films (first transparent substrate and second transparent substrate) was prepared.
<Formation of Antistatic Hard Coat Layer>
16.7 parts by weight of Baytron P CH 8000 (dispersion liquid, solid content: 3 wt %, made by H. C. Starck GmbH) as the electron-conducting polymer, 10 parts by weight of dipentaerythritol hexaacrylate (DPHA), 10 parts by weight of pentaerythritol tetraacrylate (PETA) and 30 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 33.3 parts by weight of a solvent mixture (1:1 weight ratio) of methyl ethyl ketone and butyl acetate as the solvent were mixed together to prepare the coating liquid for forming the antistatic hard coat layer. The coating liquid was coated on a transparent substrate and on one surface (first transparent substrate) of the polarizing plate, respectively, by a wire bar coater to form a coated layer. After drying in an oven at 80° C. for one minute, 5 μm-thick antistatic hard coat layers were formed on the transparent substrate and on the polarizing plate by irradiating with 120 W output power of UV using a metal halide lamp from a point 20 cm away for 10 seconds.

<Formation of Low Refractive Index Layer>
12 parts by weight of dispersion liquid of low refractive index silica particles (average particle diameter: 30 nm, solid content: 20 wt %), 1.6 parts by weight of dipentaerythritol hexaacrylate (DPHA) as the ionizing radiation curable material, 0.2 parts by weight of TSF 44 (made by GE Toshiba silicones KK) as a silicone additive, 0.2 parts by weight of Irgacure 184 (made by Ciba Japan KK) as the photopolymerization initiator, and 86.4 parts by weight of methyl isobutyl ketone as the solvent were mixed together to prepare the coating liquid for forming the low refractive index layer. The coating liquid was coated on a transparent substrate and on the antistatic hard coat layer formed on the polarizing plate, respectively, by a wire bar coater to form a coated layer. After drying in an oven, the coated layers were cured by conveyor type UV curing equipment with 500 mJ/cm$^2$ exposure to form a low refractive index layer on the antistatic hard coat layers. Each resultant low refractive index layer had a thickness of 91 nm, 1.37 of refractive index and thus 125 nm of optical thickness.

An anti-reflection film having in order a transparent substrate, an antistatic hard coat layer and a low refractive index layer, and a polarizing plate having in order a second transparent substrate, a polarizing layer, a first transparent substrate, an antistatic hard coat layer and a low refractive index layer were obtained in this way.

Example 2

<Transparent Substrate>
Similar to Example 1, an 80 μm-thick tri acetyl cellulose film was used as the transparent substrate.
<Polarizing Plate>
Similar to Example 1, a polarizing plate in which an iodine-added elongated polyvinyl alcohol as the polarizing layer was interposed between two 80 μm-thick tri acetyl cellulose films (first transparent substrate and second transparent substrate) was used.
<Formation of Antistatic Hard Coat Layer>
6.7 parts by weight of dispersion liquid of antimony doped tin oxide (ATO) particles (average particle diameter: 8 nm, solid content: 30 wt %) as the electron-conducting inorganic particles, 9.6 parts by weight of dipentaerythritol hexaacrylate (DPHA), 9.6 parts by weight of pentaerythritol tetraacrylate (PETA) and 28.8 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 45.3 parts by weight of a solvent mixture (1:1 weight ratio) of methyl ethyl ketone and butyl acetate as the solvent were mixed together to prepare the coating liquid for forming the antistatic hard coat layer. The coating liquid was coated on a transparent substrate and on one surface (first transparent substrate) of the polarizing plate, respectively, by a wire bar water to form a coated layer. After drying in an oven at 80° C. for one minute, 5 μm-thick antistatic hard coat layers were formed on the transparent substrate and on the polarizing plate by irradiating with 120 W output power of UV using a metal halide lamp from a point 20 cm away for 10 seconds.
<Formation of Low Refractive Index Layer>
Similar to Example 1, the low refractive index layer was formed on the antistatic hard coat layers which were formed on the transparent substrate and on the polarizing plate, respectively. Each resultant low refractive index layer had a thickness of 91 nm, 1.37 of refractive index and thus 125 nm of optical thickness.

An anti-reflection film having in order a transparent substrate, an antistatic hard coat layer and a low refractive index layer, and a polarizing plate having in order a second transparent substrate, a polarizing layer, a first transparent substrate, an antistatic hard coat layer and a low refractive index layer were obtained in this way.

Example 3

<Transparent Substrate>
Similar to Example 1, an 80 μm-thick tri acetyl cellulose film was used as the transparent substrate.
<Polarizing Plate>
Similar to Example 1, a polarizing plate in which an iodine-added elongated polyvinyl alcohol as the polarizing layer was interposed between two 80 μm-thick triacetyl cellulose films (first and second transparent substrate) was used.
<Formation of Antistatic Hard Coat Layer>
16.7 parts by weight of Baytron P CH 8000 (dispersion liquid, solid content: 3 wt %, made by H. C. Starck GmbH) as the electron conducting polymer, 6.7 parts by weight of a dispersion liquid of antimony doped tin oxide (ATO) particles (average particle diameter: 8 nm, solid content: 30 wt %) as the electron-conducting inorganic particles, 9.6 parts by weight of dipentaerythritol hexaacrylate (DPHA), 9.6 parts by weight of pentaerythritol tetraacrylate (PETA) and 28.8 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 28.6 parts by weight of a solvent mixture (1:1 weight ratio) of methyl ethyl ketone and butyl acetate as the solvent were mixed together to prepare the coating liquid for forming the antistatic hard coat layer. The coating liquid was coated on a transparent substrate and on one surface (first transparent substrate) of the polarizing plate, respectively, by a wire bar coater to form a coated layer. After drying in an oven at 80° C. for one minute, 5 μm-thick antistatic hard coat layers were formed on the transparent substrate and on the polarizing plate by irradiating with 120 W output power of UV using a metal halide lamp from a point 20 cm away for 10 seconds.
<Formation of Low Refractive Index Layer>
Similar to Example 1, the low refractive index layer was formed on the antistatic hard coat layers which were formed on the transparent substrate and on the polarizing plate, respectively. Each resultant low refractive index layer had a thickness of 91 nm, 1.37 of refractive index and thus 125 nm of optical thickness.

An anti-reflection film having in order a transparent substrate, an antistatic hard coat layer and a low refractive index layer, and a polarizing plate having in order a second transparent substrate, a polarizing layer, a first transparent substrate, an antistatic hard coat layer and a low refractive index layer were obtained in this way.

Comparative Example 1

<Polarizing Plate>
Similar to Example 1, a polarizing plate in which an iodine-added elongated polyvinyl alcohol as the polarizing layer was interposed between two 80 μm-thick tri acetyl cellulose films (first and second transparent substrate) was used.
<Formation of Hard Coat Layer>
10 parts by weight of dipentaerythritol hexaacrylate (DPHA), 10 parts by weight of pentaerythritol tetraacrylate (PETA) and 30 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 50 parts by weight of a solvent mixture (1:1 weight ratio) of methyl ethyl ketone and butyl acetate as the solvent were mixed together to prepare a coating liquid for forming a hard coat layer. The coating liquid was coated on one surface (first transparent substrate) of the polarizing plate by a wire bar coater to form a coated layer. After drying in an oven at 80° C. for one minute, a 5 μm-thick hard coat layer was formed on the polarizing plate by irradiating with 120 W output power of UV using a metal halide lamp from a point 20 cm away for 10 seconds.

A polarizing plate having in order a second transparent substrate, a polarizing layer, a first transparent substrate, and a hard coat layer was obtained in this way.

Comparative Example 2

<Transparent Substrate>
Similar to Example 1, an 80 μm-thick tri acetyl cellulose film was used as the transparent substrate.
<Polarizing Plate>
Similar to Example 1, a polarizing plate in which an iodine-added elongated polyvinyl alcohol as the polarizing layer was interposed between two 80 μm-thick triacetyl cellulose films (first and second transparent substrate) was used.
<Formation of Hard Coat Layer>
10 parts by weight of dipentaerythritol hexaacrylate (DPHA), 10 parts by weight of pentaerythritol tetraacrylate (PETA) and 30 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 50 parts by weight of a solvent mixture (1:1 weight ratio) of methyl ethyl ketone and butyl acetate as the solvent were mixed together to prepare a coating liquid for forming a hard coat layer. The coating liquid was coated on the transparent substrate and on one surface (first transparent substrate) of the polarizing plate, respectively, by a wire bar coater to form a coated layer. After drying in an oven at 80° C. for one minute, 5 μm-thick hard coat layers were formed on the transparent substrate and on the polarizing plate by irradiating with 120 W output power of UV using a metal halide lamp from a point 20 cm away for 10 seconds.
<Formation of Low Refractive Index Layer>
Similar to Example 1, the low refractive index layer was formed on the hard coat layers which were formed on the transparent substrate and on the polarizing plate, respectively. Each resultant low refractive index layer had a thickness of 91 nm, 1.37 of refractive index and thus 125 nm of optical thickness.

An anti-reflection film having in order a transparent substrate, a hard coat layer and a low refractive index layer, and a polarizing plate having in order a second transparent substrate, a polarizing layer, a first transparent substrate, a hard coat layer and a low refractive index layer were obtained in this way.

Comparative Example 2

<Transparent Substrate>
Similar to Example 1, an 80 μm-thick tri acetyl cellulose film was used as the transparent substrate.
<Polarizing Plate>
Similar to Example 1, a polarizing plate in which an iodine-added elongated polyvinyl alcohol as the polarizing layer was interposed between two 80 μm-thick triacetyl cellulose films (first and second transparent substrate) was used.

<Formation of Antistatic Hard Coat Layer>

33.3 parts by weight of dispersion liquid of antimony doped tin oxide (ATO) particles (average particle diameter: 60 nm, solid content: 30 wt %) as the electron-conducting inorganic particles, 8.0 parts by weight of dipentaerythritol hexaacrylate (DPHA), 8.0 parts by weight of pentaerythritol tetraacrylate (PETA) and 24.0 parts by weight of urethane acrylate UA-306T (made by Kyoeisha Chemical Co., Ltd.) as the ionizing radiation curable material, 2.5 parts by weight of Irgacure 184 (made by Ciba Japan KK) as the photopolymerization initiator, and 16.7 parts by weight of a solvent mixture (1:1 weight ratio) of methyl ethyl ketone and butyl acetate as the solvent were mixed together to prepare a coating liquid for forming an antistatic hard coat layer. The coating liquid was coated on a transparent substrate and on one surface (first transparent substrate) of the polarizing plate, respectively, by a wire bar coater to form a coated layer. After drying in an oven at 80° C. for one minute, 5 μm-thick antistatic hard coat layers were formed on the transparent substrate and on the polarizing plate by irradiating with 120 W output power of UV using a metal halide lamp from a point 20 cm away for 10 seconds.

<Formation of Low Refractive Index Layer>

Similar to Example 1, the low refractive index layer was formed on the antistatic hard coat layers which were formed on the transparent substrate and on the polarizing plate, respectively. Each resultant low refractive index layer had a thickness of 91 nm, 1.37 of refractive index and thus 125 nm of optical thickness.

An anti-reflection film having in order a transparent substrate, an antistatic hard coat layer and a low refractive index layer, and a polarizing plate having in order a second transparent substrate, a polarizing layer, a first transparent substrate, an antistatic hard coat layer and a low refractive index layer were obtained in this way.

The anti-reflection films obtained in Examples 1-3 and Comparative examples 2-3 were performed following measurements. In addition, the polarizing plates obtained in Examples 1-3 and Comparative examples 1-3 were measured as follows.

<<Characteristics Measurements of Anti-Reflection Film>>
<Haze (H) and Parallel Light Transmittance>

Haze (H) and parallel light transmittance of the anti-reflection films obtained in Examples and Comparative examples were measured by a haze turbidimeter instrument (NDH-2000 made by Nippon Denshoku Industries Co., Ltd.).

<Absorption Loss in Average Luminous Transmittance and Absorption Loss in Light Transmittance at Various Wavelengths>

The anti-reflection films obtained in Examples and Comparative examples were measured by spectral reflectance and spectral transmittance in a rectilinear direction and specular direction using an automated spectral photometer (U-4000 made by Hitachi Ltd.) along with the C light source under a condition of 2 degrees of field of view, adjusting incident and output angles of the light source and detector at angles of 5 degrees to a normal direction of the anti-reflection film surface. Then, absorption loss in average luminous transmittance (Q), difference between the maximum and the minimum absorption loss in light transmittance in the wavelength region of the visible light, absorption loss in light transmittance at various wavelengths ($Q_{450}$: absorption loss in light transmittance at a wavelength of 450 nm, $Q_{550}$: absorption loss in light transmittance at wavelength of 550 nm, and $Q_{650}$: absorption loss in light transmittance at wavelength of 650 nm) were calculated. At this time, the absorption loss in light transmittance at various wavelengths ($Q_{450}$, $Q_{550}$, and $Q_{650}$) was obtained by Formula 1 below. The absorption loss in average luminous transmittance (Q) was obtained by correcting with relative luminosity and averaging the absorption loss in light transmittance at various wavelengths ($Q_{450}$, $Q_{550}$, and $Q_{650}$), which was obtained by Formula 1. In addition, photopic relative luminosity was used as the relative luminosity.

$$Q_\lambda = 100 - T_\lambda - R_\lambda \qquad \text{Formula 1}$$

where $Q_\lambda$: absorption loss in light transmittance (%)

H: haze (%)

$T_\lambda$: spectral transmittance (%)

$R_\lambda$: both surface reflectance (%) at a wavelength λ

<Average Luminous Reflectance and Hue of Reflection>

The anti-reflection films obtained in Examples and Comparative examples were painted black with matte-black spray on the opposite side from the surface on which the low refractive index layer was formed. After painting, spectral reflectance on the low refractive index layer surface at 5 degrees of incident angle was measured using an automated spectral photometer (U-4000 made by Hitachi Ltd.) under a condition of C light source and 2 degrees of field of view. Then, average luminous reflectance and hue of reflection (a*, b*) were calculated from the result of the spectral reflectance.

<Surface Resistivity>

The surface resistivities of the anti-reflection films were measured with a high resistivity measurement meter (Hiresta MCP-HT260 made by DIA Instruments Co., Ltd.) by conforming to JIS (Japanese Industrial Standards) K6911.

<<Characteristics Measurements of Polarizing Plates>>
<Average Luminous Transmittance (Parallel Orientation and Orthogonal Orientation) and Hue (Parallel Orientation)>

Each polarizing plate obtained in Examples and Comparative examples and a polarizing plate which is identical to the polarizing plate firstly prepared in Example 1 etc. having no hard coat layer and anti-reflection layer therein yet (=second polarizing plate) were arranged via a tackiness layer in such a way that polarizing axes were oriented parallel to each other. Spectral transmittance in a rectilinear direction at incident and output angles of the light source and the detector of 5 degrees to the normal direction of the anti-reflection film surface was measured using an automated spectral photometer (U-4000 made by Hitachi Ltd.) under a condition of C light source and 2 degrees of field of view. Then, average luminous transmittance and hue (a*, b*) in the case of parallel orientation were calculated from the result of the spectral reflectance.

In addition, each polarizing plate obtained in Examples and Comparative examples and a polarizing plate having no hard coat layer and anti-reflection layer therein yet (=second polarizing plate) were arranged via a tackiness layer in such a way that polarizing axes were oriented orthogonal to each other. Spectral transmittance in a rectilinear direction at incident and output angles of the light source and the detector of 5 degrees to the normal direction of the anti-reflection film surface was measured using an automated spectral photometer (U-4000 made by Hitachi Ltd.) under a condition of C light source and 2 degrees of field of view. Then, average luminous transmittance and hue (a*, b*) in the case of parallel orientation were calculated from the result of the spectral reflectance.

Results of the measurements are shown in Tables 1A, 1B and 1C.

TABLE 1A

| | Anti-reflection film | | | | |
|---|---|---|---|---|---|
| | Average luminous reflectance (%) | Haze (%) | Parallel light transmittance (%) | Absorption loss in parallel light transmittance Q (%) | Difference between max. and min. absorption loss in light transmittance (%) |
| Example 1 | 1.1 | 0.1 | 95.3 | 0.9 | 0.8 |
| Example 2 | 1.1 | 0.2 | 94.9 | 1.3 | 0.6 |
| Example 3 | 1.1 | 0.2 | 94.3 | 2.2 | 1.8 |
| Comparative example 1 | — | — | — | — | — |
| Comparative example 2 | 1.1 | 0.1 | 96.1 | <0.1 | <0.1 |
| Comparative example 3 | 1.1 | 0.6 | 85.2 | 6.4 | 4.1 |

TABLE 1B

| | Anti-reflection film | | | | | |
|---|---|---|---|---|---|---|
| | Absorption loss in light transmittance Q at various wavelengths (450 nm, 550 nm, 650 nm) | | | Hue of reflection | | Surface resistivity |
| | $Q_{450}$ | $Q_{550}$ | $Q_{650}$ | a* | b* | (Ω/□) |
| Example 1 | 0.7% | 0.9% | 1.3% | 2.7 | −1.8 | $2.0 \times 10^8$ |
| Example 2 | 1.0% | 1.3% | 1.5% | 2.8 | −2.1 | $7.0 \times 10^9$ |
| Example 3 | 1.5% | 2.3% | 2.8% | 2.7 | −1.9 | $1.0 \times 10^8$ |
| Comparative example 1 | — | — | — | — | — | — |
| Comparative example 2 | <0.1% | <0.1% | <0.1% | 2.7 | −1.8 | $>1.0 \times 10^{13}$ |
| Comparative example 3 | 4.8% | 6.6% | 7.5% | 2.6 | −0.8 | $2.0 \times 10^{10}$ |

TABLE 1C

| | Polarizing plate | | | |
|---|---|---|---|---|
| | Parallel average luminous transmittance (%) | Hue of reflection | | Orthogonal average luminous transmittance (%) |
| | | a* | b* | |
| Example 1 | 40.0 | −2.4 | 5.8 | 0.06 |
| Example 2 | 39.8 | −1.9 | 2.8 | 0.05 |
| Example 3 | 39.2 | −1.8 | 2.4 | 0.03 |
| Comparative example 1 | 38.2 | −2.9 | 7.2 | 0.04 |
| Comparative example 2 | 40.2 | −3.1 | 8.1 | 0.08 |
| Comparative example 3 | 35.1 | −2.4 | 6.2 | 0.02 |

<<Contrast Evaluation>>

In addition, each anti-reflection film obtained in Examples 1 to 3 and Comparative examples 2 and 3 were pasted to a surface of a transmissive LCD (FTD-W2023 ADSR made by BUFFALO Inc.) via a tackiness layer in such a way that a side on which the anti-reflection was formed was arranged nearest to an observer. The transmissive LCD to which the anti-reflection film was pasted was measured with respect to luminance of black image and white image in a bright (200 lx) place and in a dark (0 lx) place by flipping on and off the switch of the interior illumination so as to evaluate contrast.

In the transmissive LCD with the anti-reflection film of Example 1 to 3, it was confirmed that contrast in a dark place was improved because the luminance when displaying a black image (black luminance) in a dark place decreased more than that in the case of transmissive LCD with the anti-reflection film of Comparative example 2. In the transmissive LCD with the anti-reflection film of Comparative example 3, it was confirmed that contrasts both in a bright place and in a dark place decreased because not only the black luminance in a dark place but also the luminance when displaying a white image (white luminance) in both in a bright place and in a dark place decreased more than that in the case of transmissive LCD with the anti-reflection film of Comparative example 2.

What is claimed is:

1. An anti-reflection film comprising:
    a transparent substrate;
    an antistatic hard coat layer; and
    a low refractive index layer,
wherein said antistatic hard coat layer and said low refractive index layer is formed on at least one surface of said transparent substrate, the refractive index of the low refractive index layer is lower than a refractive index of the antistatic hard coat layer, said antistatic hard coat layer has conductive inorganic particles of which content ratio are less than 5 wt %, and a difference between the maximum and the minimum absorption loss in light transmittance of said anti-reflection film at various wavelengths in the visible light region is in the range of 0.5-4.0%, and absorption losses in light transmittance of said anti-reflection film at wavelengths of 450 nm, 550 nm and 650 nm, $Q_{450}$, $Q_{550}$ and $Q_{650}$ respectively, satisfies a relation $Q_{450}<Q_{550}<Q_{650}$.

2. The anti-reflection film according to claim 1, wherein said antistatic hard coat layer includes at least one of antimony-doped tin oxide (ATO), phosphor-doped tin oxide (PTO) and fluorine-doped tin oxide (FTO).

3. The anti-reflection film according to claim 1, wherein said low refractive index layer has surface resistivity in the range of $1.0 \times 10^6$ to $1.0 \times 10^{11}$ Ω/cm².

4. The anti-reflection film according to claim 1, wherein a hue of reflection on a surface of said low refractive index layer in L*a*b* color coordinate system satisfies 0.0≤a*≤3.0 and −3.0≤b*≤3.0.

5. A polarizing plate comprising:
    the anti-reflection film according to claim 1;
    a polarizing layer; and
    a second transparent substrate,
said polarizing layer being formed on a surface of said anti-reflection film opposite from a side on which said low refractive index layer is formed, and said second transparent substrate being arranged on said polarizing layer.

6. A transmissive liquid crystal display device comprising:
    the polarizing plate according to claim 5;
    a liquid crystal cell;

a second polarizing plate; and
a backlight unit,
said polarizing plate, said liquid crystal cell, said second polarizing plate and said backlight unit being arranged in this order.

* * * * *